US012631444B2

(12) United States Patent
Corghi

(10) Patent No.: US 12,631,444 B2
(45) Date of Patent: May 19, 2026

(54) APPARATUS AND METHOD FOR MEASURING VEHICLE ALIGNMENT

(71) Applicant: NEXION S.P.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 1223 days.

(21) Appl. No.: 17/379,096

(22) Filed: Jul. 19, 2021

(65) Prior Publication Data

US 2022/0018655 A1     Jan. 20, 2022

(30) Foreign Application Priority Data

Jul. 20, 2020     (IT) ........................ 102020000017578

(51) Int. Cl.
　　*G01B 11/275*　　　(2006.01)
　　*G01M 17/013*　　　(2006.01)
(52) U.S. Cl.
　　CPC ....... *G01B 11/2755* (2013.01); *G01M 17/013* (2013.01); *G01B 2210/143* (2013.01); *G01B 2210/30* (2013.01)
(58) Field of Classification Search
　　CPC .............. G01B 11/275; G01B 11/2755; G01B 2210/14; G01B 2210/143; G01B 2210/146; G01B 2210/30; G01B 2210/303; G01B 2210/306; G01M 17/013; F16M 11/043; F16M 11/045; F16M 11/046; F16M 11/048
　　See application file for complete search history.

(56) References Cited

U.S. PATENT DOCUMENTS

| | | | |
|---|---|---|---|
| 8,274,648 B2 | 9/2012 | Corghi | |
| 8,492,701 B2 | 7/2013 | Nobis et al. | |
| 2004/0139620 A1* | 7/2004 | Stopa ................. | G01B 11/2755 |
| | | | 33/203.18 |
| 2005/0078304 A1* | 4/2005 | Dorrance ............... | G01C 11/04 |
| | | | 356/139.09 |
| 2010/0321674 A1 | 12/2010 | Corghi | |
| 2011/0302795 A1* | 12/2011 | Nobis ................ | G01B 11/2755 |
| | | | 33/288 |

(Continued)

FOREIGN PATENT DOCUMENTS

| | | |
|---|---|---|
| CN | 101691995 A | 4/2010 |
| CN | 101691995 B | 10/2011 |

(Continued)

*Primary Examiner* — Yuqing Xiao
(74) *Attorney, Agent, or Firm* — Chrisman Gallo Tochtrop LLC

(57) ABSTRACT

An apparatus (1) for measuring an alignment of a wheeled vehicle (V), comprises: two contact tracks (P) for the wheels of the vehicle, extending along a longitudinal direction (L); a measuring assembly (2), including a measuring unit (21), for capturing one or more images of the vehicle and generating corresponding image data, and a connector (22), having a first end (22A) connected to the measuring unit (21) and positioned at a first height (Q1), and a second end (226), positioned at a second height (Q2), greater than the first height (Q1); a control unit (3), configured to receive the image data (301) from the measuring unit (21) and to process the image data (301) to derive vehicle alignment information therefrom. The measuring unit (21) is movable towards and away from the contact tracks (P).

20 Claims, 5 Drawing Sheets

(56)  References Cited

U.S. PATENT DOCUMENTS

| | | | | |
|---|---|---|---|---|
| 2014/0253909 A1* | 9/2014 | McClenahan | G01B 11/2755 | |
| | | | 356/139.09 | |
| 2015/0168719 A1* | 6/2015 | Kim | G02B 27/01 | |
| | | | 345/7 | |
| 2016/0173740 A1* | 6/2016 | Corby | H04N 23/60 | |
| | | | 348/148 | |
| 2017/0016716 A1 | 1/2017 | Fiess et al. | | |
| 2018/0053320 A1* | 2/2018 | Kunert | G06T 7/60 | |
| 2019/0033063 A1 | 1/2019 | Bidel | | |
| 2020/0175791 A1* | 6/2020 | Kim | G01S 7/40 | |
| 2022/0136824 A1* | 5/2022 | Arruda | G01B 11/275 | |
| | | | 356/139.09 | |

FOREIGN PATENT DOCUMENTS

| | | | |
|---|---|---|---|
| EP | 1882155 | B1 | 7/2009 |
| EP | 1335181 | B1 | 11/2009 |
| EP | 2205925 | B1 | 11/2016 |
| IT | MI2009167 | U | 5/2009 |

* cited by examiner

APPARATUS AND METHOD FOR MEASURING VEHICLE ALIGNMENT

This invention relates to an apparatus for measuring a vehicle alignment and to a method for measuring a vehicle alignment.

Some apparatuses for measuring vehicle alignment include one or more cameras which are configured to capture images of the vehicle, specifically of the vehicle wheels (that is, of the edge of the wheel rim in contact with the tyre), on the basis of which a control unit, through specific software, determines the characteristic angles that define the alignment of the vehicle.

To obtain a correct measurement, therefore, positioning the cameras relative to the vehicle is critical. In this regard, it should be noted that in some applications, the vehicle is lifted off the ground by a vehicle lift. In such a case, it is important to provide a solution that is capable of measuring the vehicle alignment even when the vehicle is in the raised position.

In some prior art solutions in the field of vehicle alignment measurement, a target is attached to the lift and a plurality of cameras are mounted in the workspace (the workshop). Some of these cameras are hung from the ceiling, others are mounted on the walls and others still are mounted on the floor. These cameras are integral with the workspace. In order to frame the target and the vehicle at each position of the vehicle lift, it is necessary to provide numerous cameras on both sides of the vehicle. This solution is described in document ITM120090167.

In other solutions, the cameras are integral with the vehicle lift so that the relative positions between the vehicle and the cameras do not change with the height of the vehicle lift. In these solutions, however, described for example in documents EP1882155B1, EP2205925B1, US20170016716A1 and EP1335181B1 (the last being in the name of the present Applicant), the cameras on the lift may get in the way of operators wishing to carry out maintenance on the vehicle. In addition, moving the cameras as one with the lift may upset the calibration of the cameras, resulting in imprecise measurement of the alignment.

Also known are solutions, described for example in document EP2205925B1, where the operator's work is hampered by the cameras even if the cameras are not mounted on a vehicle lift.

In yet another solution, described in document U.S. Pat. No. 8,492,701 B2, the cameras are mounted at four predetermined positions, aligned with the tyres of the vehicle being measured. This solution, however, does not solve the problem related to changes in the height of the vehicle.

The following documents also show solution of apparatus and a method for measuring a vehicle alignment: U.S. Pat. No. 8,274,648B2, CN101691995B, US2004139620, US2019033063A1 and US2015168719A1. However, also these documents are affected by the drawbacks mentioned above.

This invention has for an aim to provide an apparatus and a method for measuring a vehicle alignment to overcome the above mentioned drawbacks of the prior art.

This aim is fully achieved by the apparatus and method of this disclosure as characterized in the appended claims.

According to an aspect of it, this disclosure provides an apparatus for measuring the alignment of a wheeled vehicle, preferably with tyred wheels. The apparatus comprises two contact tracks for the wheels of the vehicle, extending along a longitudinal direction.

The apparatus comprises a measuring assembly.

The measuring assembly includes a measuring unit. The measuring unit is configured to capture one or more images of the vehicle. The measuring unit is configured to generate corresponding image data.

In an embodiment, the measuring assembly includes a connector. The connector has a first end which is connected to the measuring unit. The first end is positioned at a first height. The connector has a second end which is positioned at a second height.

In a preferred embodiment, the second height is greater than the first height.

This allows the measuring unit to be connected at a high connecting point where it does not get in the way of an operator who needs to carry out work on the vehicle.

The apparatus comprises a control unit. The control unit is configured to receive the image data from the measuring unit. The control unit is configured to process the image data to derive vehicle alignment information therefrom.

In an embodiment, the measuring unit is movable towards and away from the contact tracks. The fact that the measuring unit is movable towards and away from the contact tracks offers two important advantages. On the one hand, moving the measuring unit allows following the movements of the vehicle on the lift and, on the other, once the alignment has been measured, the measuring unit can be moved out of the way, into zones which allow, or at least do not hamper, removing the vehicle from the zone where the measurement was carried out.

In an embodiment, the connector is movable between an extended position, where the first and the second end are spaced apart by a first distance, and a retracted position, where the first and the second end are spaced apart by a second distance. The first distance is greater than the second distance. Thus, varying the extension of the connector allows the measuring unit to be moved so that its position (that is, its height) relative to the two tracks, is varied accordingly.

In an embodiment, the apparatus comprises a supporting assembly. The supporting assembly is located (partly) above the two tracks. It should be noted that the supporting assembly may be connected to the floor, to a wall or to the ceiling of the workspace where measurement is carried out. Thus, if it is connected to the ceiling or to a wall, the supporting assembly is located above the two tracks, whereas if it is connected to the floor, the supporting assembly is located only partly above the two tracks. The second end of the connector is connected to the supporting assembly. More specifically, the second end of the connector is connected to the supporting assembly in a zone that is located above the two tracks.

It should be borne in mind that the supporting assembly can be made in various different ways, which include deployment of a wall, of the ceiling or of another fixed structure. In effect, in some embodiments, the connector of the measuring assembly may be connected directly to the ceiling (at its second end), to the wall, to the floor or to any other structure that is integral with the two tracks.

In an embodiment, the supporting assembly comprises a carriage. The carriage is connected to the second end of the connector. The carriage is movable along a predetermined path. The carriage allows the measuring unit to be moved not only towards and away from the tracks but also in a plane parallel to the plane which includes the two tracks.

In an embodiment, the supporting assembly comprises a first vertical column. The first vertical column extends vertically between a first end and a second end.

In an embodiment, the supporting assembly comprises a beam.

The beam extends between a first end, connected to the second end of the first vertical column, and a second end.

In an embodiment, the arm is movably connected to the beam. The beam thus defines the predetermined path along which the carriage, hence the measuring unit, moves.

In an embodiment, the supporting assembly comprises a second vertical column. The second vertical column extends vertically between a respective first end and a respective second end. The second end of the second vertical column is connected to the second end of the beam. That way, according to this embodiment, the supporting assembly defines a supporting portal structure. The first end of the first vertical column and the first end of the second vertical column are positioned at respective vertical heights which are greater than the first height.

In a preferred embodiment, the vertical heights are the same. Preferably, the beam is parallel to the supporting plane that includes the two tracks.

The beam is preferably horizontal.

It should be remembered that in an embodiment, the second end of the first vertical column and the second end of the second vertical column are connected to the floor of the workspace while, in another embodiment, the second end of the first vertical column and the second end of the second vertical column are connected to the ceiling so as to minimize the space occupied by the measuring apparatus.

In an embodiment, the predetermined path is parallel to the tracks. In an embodiment, the predetermined path is included in a movement plane parallel to the supporting plane that includes the two tracks. In this embodiment, the predetermined path may vary its direction while remaining in the movement plane.

In an embodiment, the supporting assembly and the connector are embodied by an articulated arm. In an embodiment, the supporting assembly comprises a first part of the articulated arm having one end pivotally connected to the ceiling. Preferably, the connector comprises the second part of the articulated arm and has one end connected to the measuring unit. Preferably, the articulated arm has one end which can move in a vertical direction, parallel to the weight force, and in a horizontal direction, perpendicular to the weight force.

In an embodiment, the apparatus comprises an additional measuring assembly that includes a respective measuring unit and a respective connector. In this embodiment, the measuring assembly is positioned beside a first longitudinal side of the two tracks, while the additional measuring assembly is positioned beside a second longitudinal side of the two tracks, opposite the first longitudinal side.

In an embodiment, the measuring assembly and/or the additional measuring assembly each include a respective additional measuring unit. In an embodiment, the measuring assembly and/or the additional measuring assembly each include a respective additional connector, connected to the corresponding additional measuring unit. That means the measuring assembly may have two measuring units, each dedicated to a respective wheel of the two mounted on a first side of the vehicle, and the additional measuring assembly may have two measuring units, each dedicated to a respective wheel of the two mounted on a second side of the vehicle, opposite the first side.

The additional measuring unit is connected to the control unit.

The control unit uses the data received from the additional measuring unit to calculate the alignment.

In an embodiment, the apparatus comprises a reference element. The reference element is located at a predetermined position relative to the contact tracks. The measuring assembly is configured to capture reference data representing an image of the reference element. The measuring assembly is configured to send the reference data to the control unit. That way, the control unit may correlate the measurements while taking into account the position of the measuring unit in deriving the alignment of the vehicle. In other words, the control unit may determine the position of the measuring unit and, consequently, the position of the wheel relative to an (absolute) external reference.

In other words, the measurements performed by the different measuring units must all take into account the same reference—that is, the reference element. To do that, each measuring unit frames the reference element to allow deriving its position relative to the reference element.

To facilitate measurement, the reference element may be made up of two distinct parts whose mutual position is known. In other words, the apparatus comprises a first and a second reference element, each configured to be framed by one or more measuring units of the apparatus. The measuring unit has access to a distance and, if necessary, to a rotation (a mutual position) between the first and the second reference element.

In an embodiment, the (or each) measuring unit (additional measuring unit) comprises a respective first camera. The first camera is configured to capture images of the vehicle, specifically of the wheel (hence the image data). In an embodiment, the (or each) measuring unit (additional measuring unit) comprises a respective second camera. The second camera is configured to capture the reference data. The first camera may be a single camera or a multiple (that is, stereo) camera made up of two cameras.

The present disclosure also provides other solutions to carry out the correlation of the measurement and allow the measurements made by the unit of measurement and the additional unit of measurement to be calculated with respect to the same reference.

According to a first embodiment, the measurement unit and the additional measurement unit each include a respective reference camera. The reference camera of the measurement unit is configured to frame the additional measurement unit in order to perform the measurement by correlating it to the position of the additional measurement unit.

The reference camera of the additional measurement unit is configured to frame the measurement unit in order to perform the measurement by correlating it to the position of the measurement unit.

In an embodiment, the apparatus comprises an actuating assembly. The actuating assembly is configured to move the measuring unit. When the actuating assembly is provided, the control unit is configured to command the actuating assembly to move the measuring unit towards and/or away from the two tracks. It should be borne in mind that this disclosure also intends protecting a manually operated solution in which the operator manually moves the measuring unit to the optimum position and actively authorizes image capture.

According to an aspect of it, this disclosure provides a method for measuring the alignment of a wheeled vehicle, preferably with tyred wheels.

The method comprises a step of preparing two contact tracks, extending along a longitudinal direction. The step of preparing includes also providing a measuring assembly, including a measuring unit and a connector, having a first end, connected to the measuring unit and positioned at a first height, and a second end, positioned at a second height, greater than the first height.

The method comprises a step of positioning the vehicle on the two contact tracks.

The method comprises a step of capturing one or more images of the vehicle through the measuring unit. The method comprises a step of generating corresponding image data, preferably through the measuring unit. The method comprises a step of sending the image data to a control unit.

The method comprises a step of processing the image data in the control unit in order to derive vehicle alignment information therefrom. The step of processing comprises a step of deriving characteristic alignment parameters based on the image data.

In an embodiment, the method comprises a step of moving the measuring unit towards and away from the contact tracks.

In the step of moving, the measuring unit is moved along a vertical direction parallel to the weight force.

In the step of moving, the measuring unit is moved along a predetermined path, preferably parallel to the weight force.

In an embodiment, in the step of capturing, the measuring unit captures an image of the vehicle from a position above the vehicle, to capture an image of the vehicle, preferably of the vehicle wheels, from above. This allows obtaining images of the vehicle from above, which can provide further information about the measurement.

In an embodiment, the method comprises a step of correlating. In the step of correlating, the measuring unit captures reference data, representing an image of a reference element located at a predetermined position (relative to the two tracks). The reference data represent a position of the reference element relative to the absolute external reference.

In the step of correlating, the measuring unit sends the reference data to the control unit to perform a correlation of the measurements taken by the measuring unit. The same also occurs for the other measuring units of the apparatus.

This allows making the measurements consistent for all vehicle wheels.

In an embodiment, the method comprises a step of correlating, in which a lens of the measuring unit is calibrated, preferably periodically.

In an embodiment, the method comprises a step of preparing a supporting assembly, including a carriage to which the connector is connected.

In an embodiment, the method comprises a step of moving the carriage along a predetermined path on the supporting assembly.

These and other features will become more apparent from the following detailed description of a preferred embodiment, illustrated by way of non-limiting example in the accompanying drawings, in which.

Figure 1A:
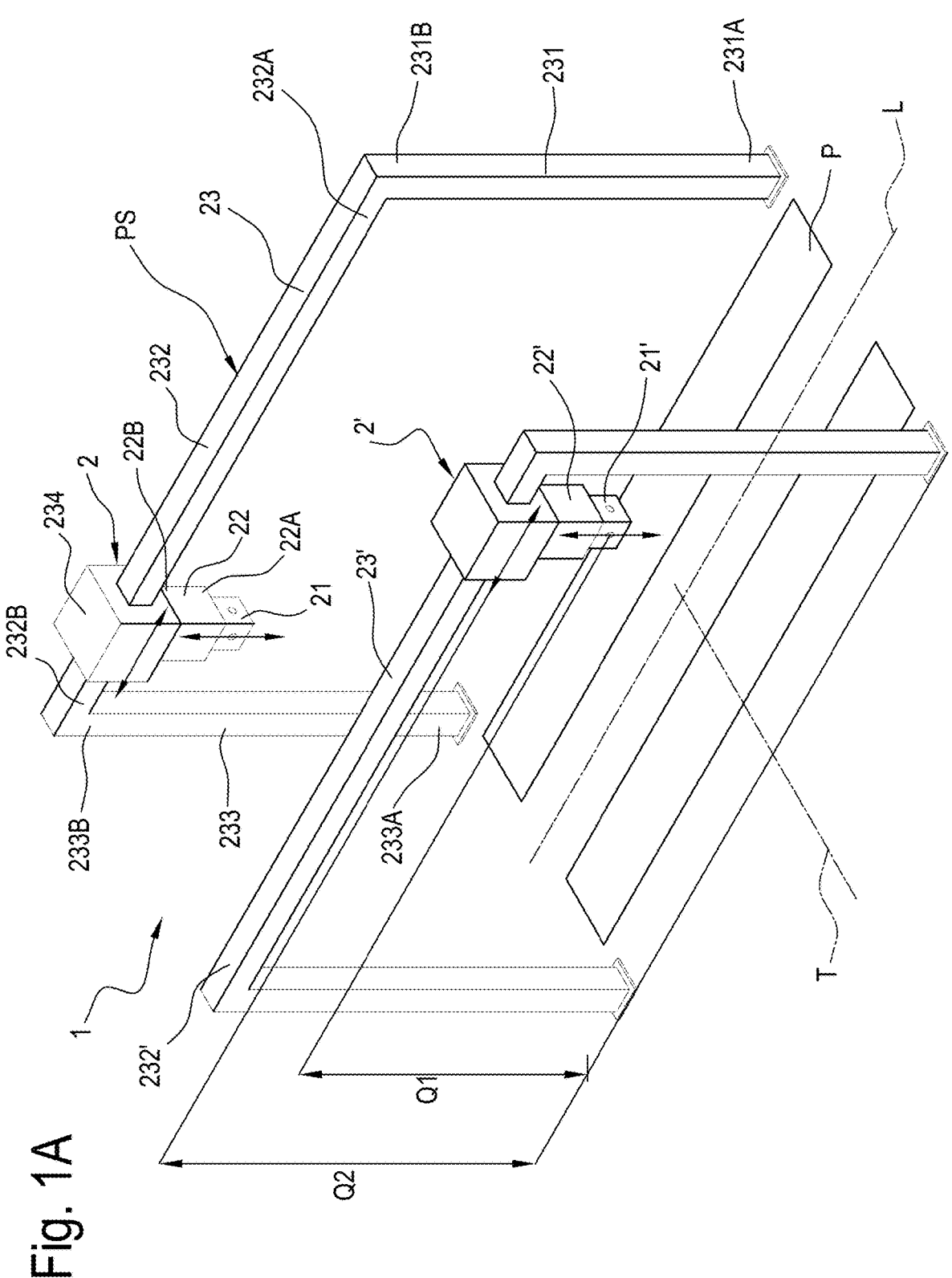
FIGS. 1A and 1B show schematic perspective views of, respectively, a first and a second embodiment of an apparatus for measuring a vehicle alignment.
Figure 1B:
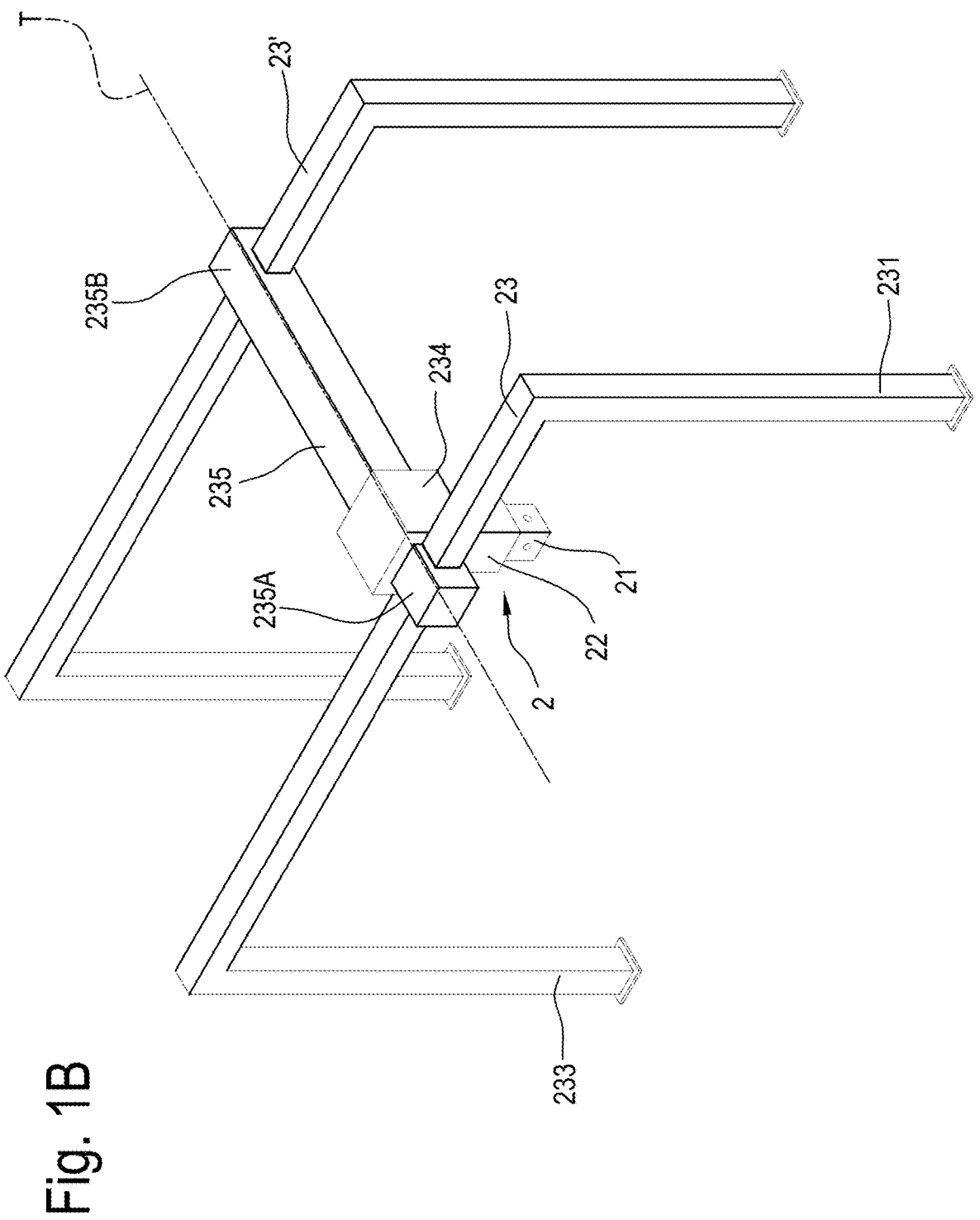
Figure 2B:
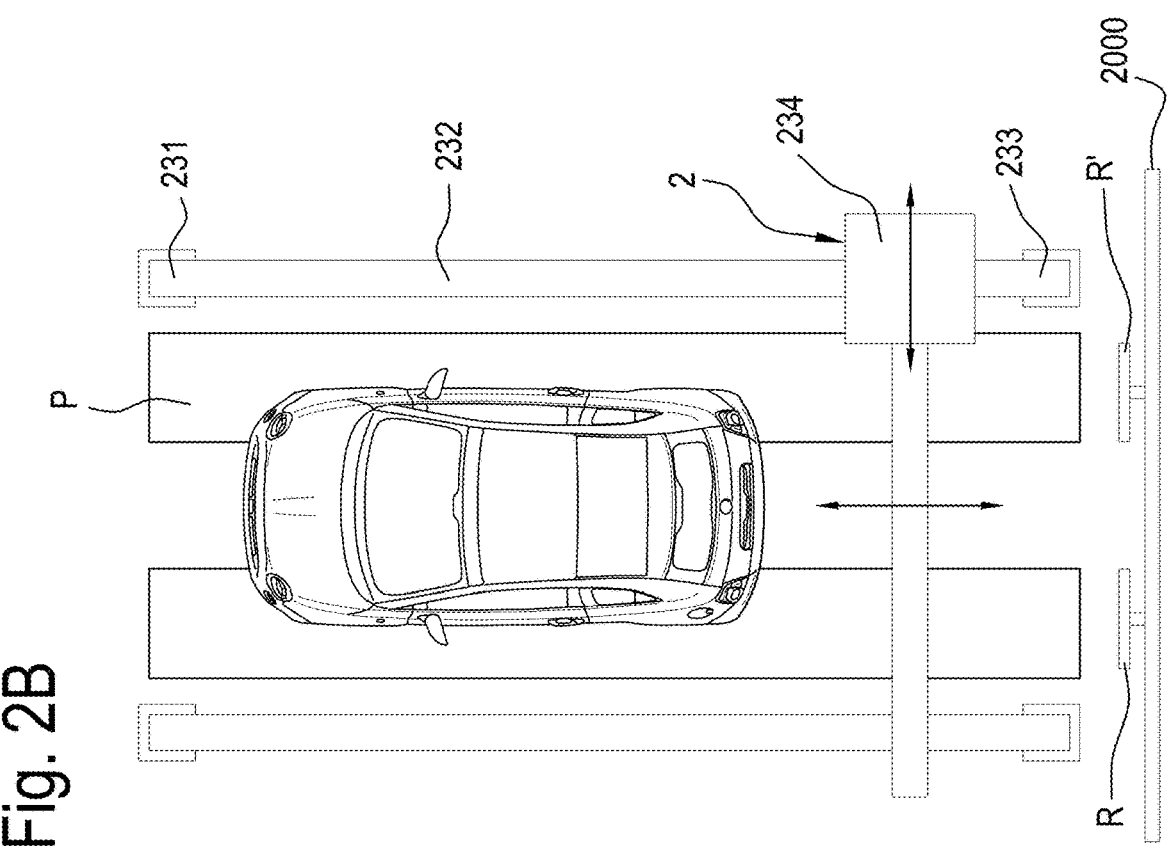
FIGS. 2A and 2B show schematic plan views of the measuring apparatus according to the first embodiment of FIG. 1A and according to the second embodiment of FIG. 1B, respectively.
Figure 2A:
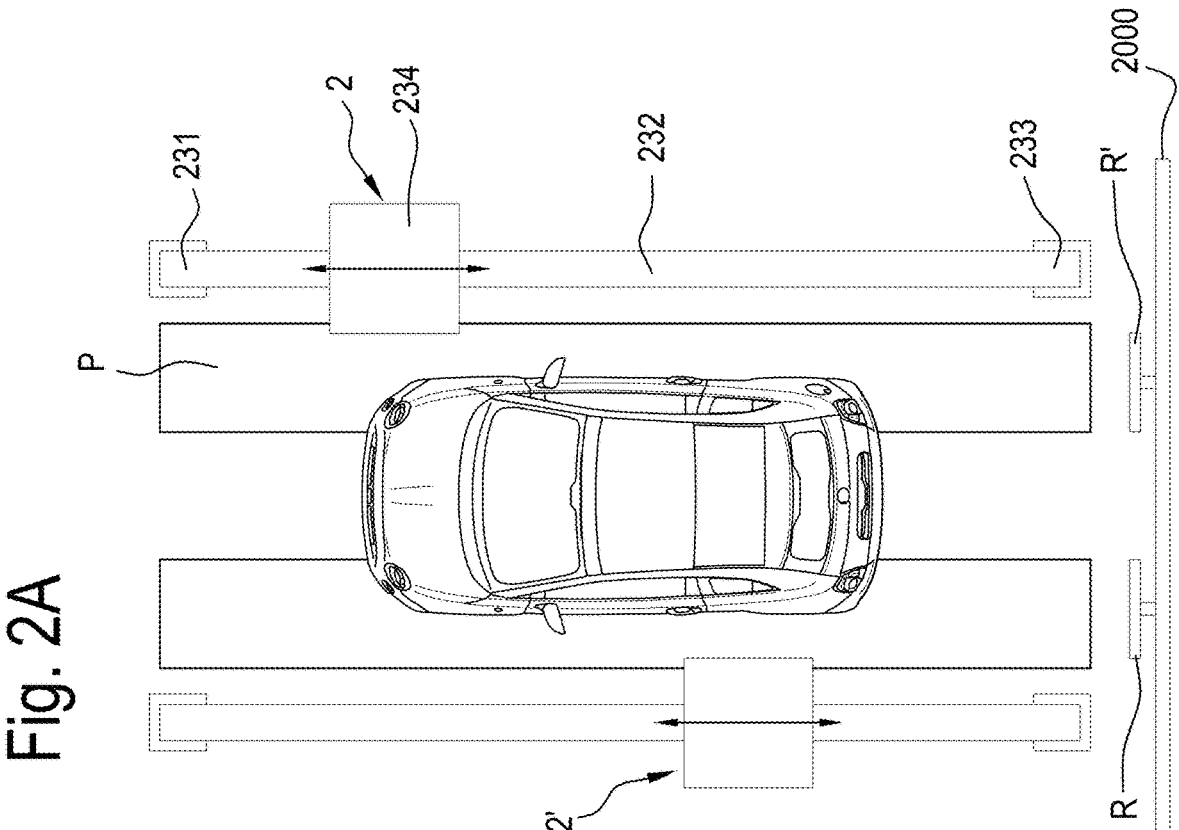
Figure 3:
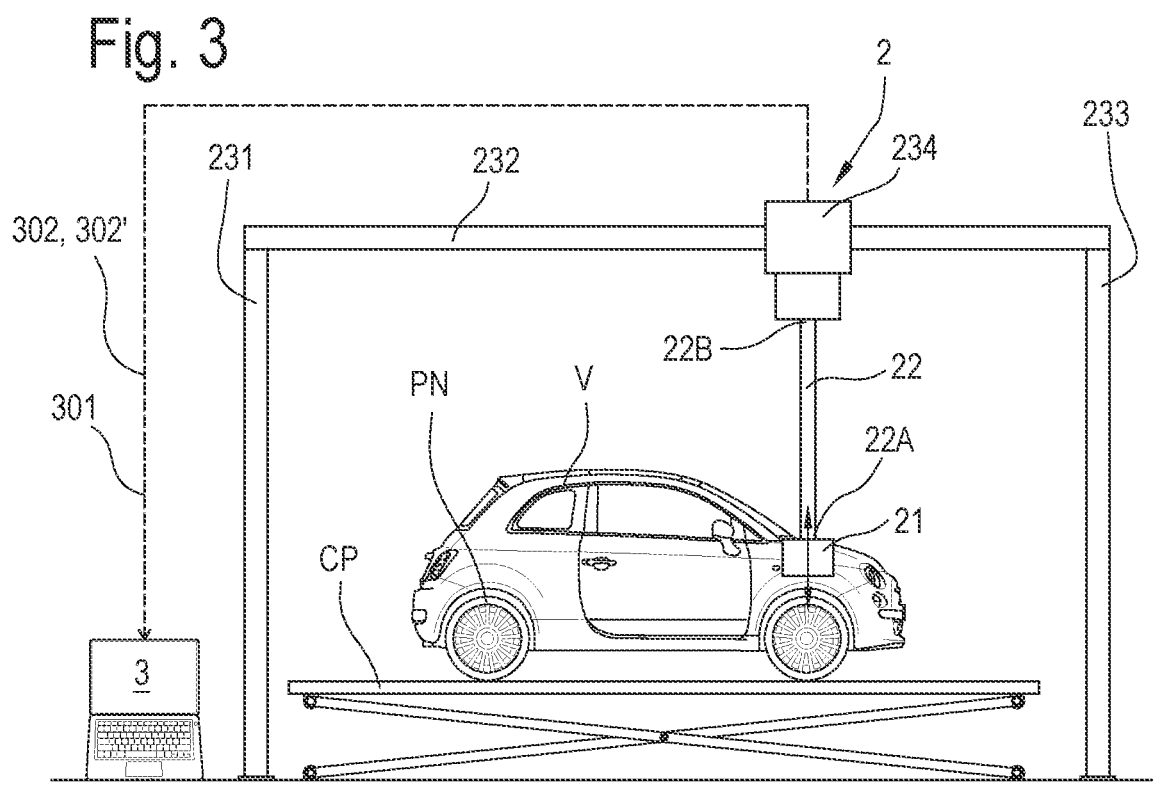
FIG. 3 shows a side view of the measuring apparatus according to the second embodiment of FIG. 1B.
Figure 4:
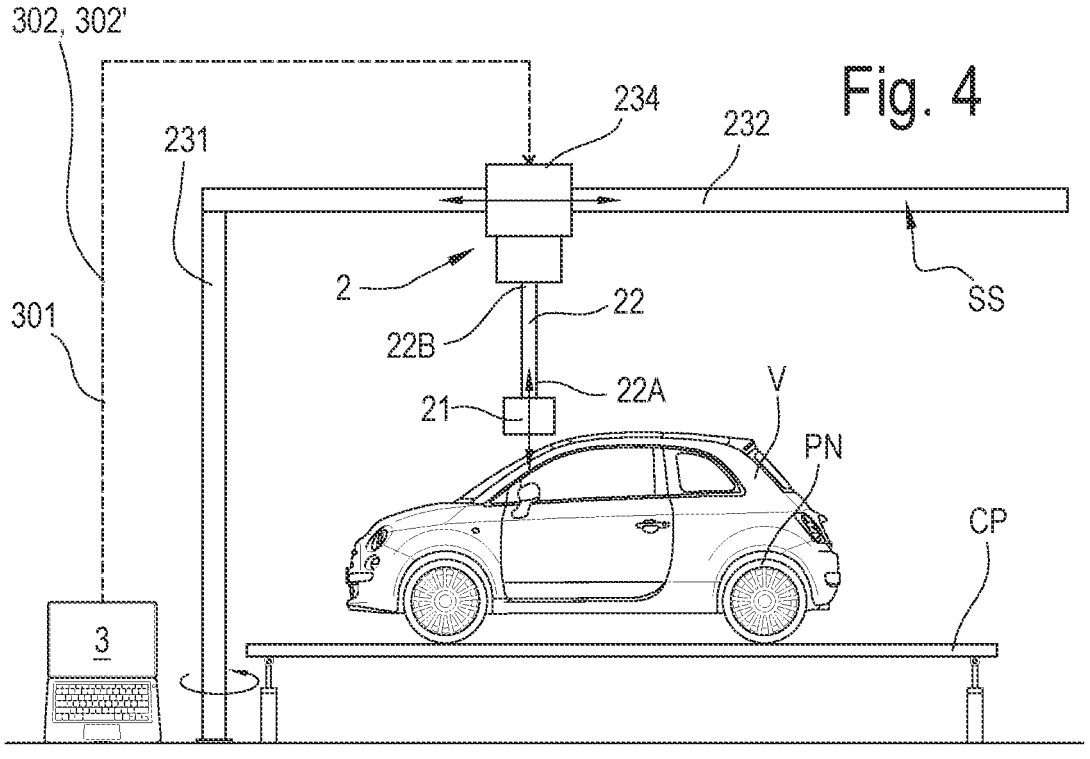
FIG. 4 shows a side view of a further embodiment of an apparatus for measuring an alignment of a tyred vehicle.
Figure 5:
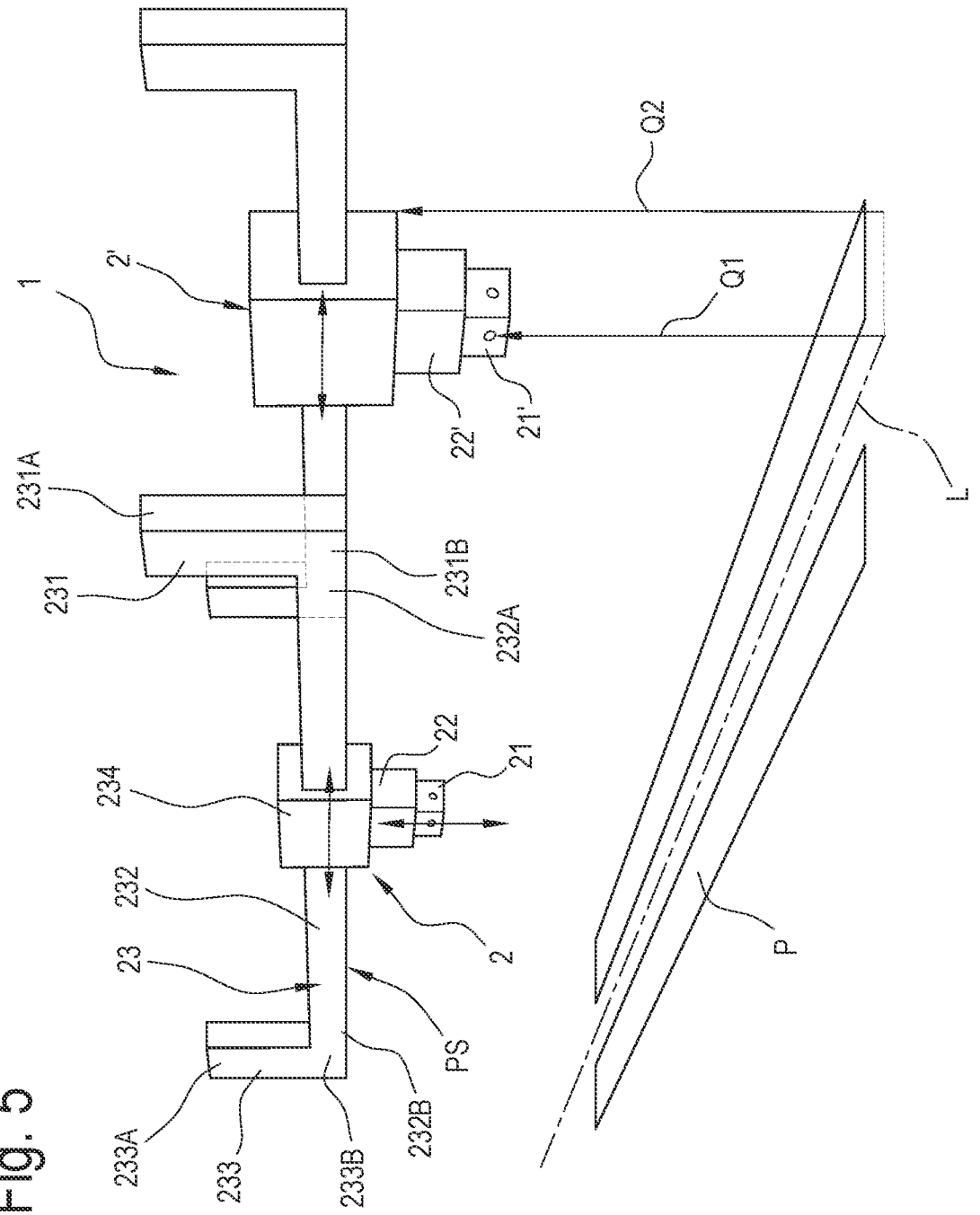
FIG. 5 shows a perspective view of a further embodiment of an apparatus for measuring an alignment of a tyred vehicle.

With reference to the accompanying drawings, the numeral 1 denotes an apparatus for measuring an alignment of a wheeled vehicle, preferably with tyres PN.

The apparatus 1 comprises two tracks P, which are configured to receive the wheels of the vehicle V. During measurement, therefore, the wheels are positioned on the two tracks P.

The apparatus 1 comprises a measuring assembly 2. The measuring assembly 2 is configured to perform the alignment measurement on the vehicle V.

The measuring assembly 2 comprises a measuring unit 21. The measuring unit 21 is configured to capture images of the vehicle V, preferably images of the wheels of the vehicle V. The measuring unit 21 comprises a camera (first camera). The camera is configured to capture images of the vehicle V, preferably images of the wheels of the vehicle V. The measuring unit 21 is configured to generate image data 301 as a function of the images captured.

The apparatus 1 comprises a control unit 3. The measuring unit 21 is configured to send the image data 301 to the control unit 3.

In an embodiment, the measuring unit 21 (comprising a camera or a pair of stereo cameras) is rotatable (is configured to rotate) about a vertical axis so it is oriented to obtain a correct image of the wheel.

The apparatus comprises a reference element R, integral with the workspace in which the apparatus 1 operates.

The measuring unit 21 (comprising the camera or the pair of stereo cameras) is configured to capture an image of the reference element R. The measuring unit 21 (comprising the camera or the pair of stereo cameras) is configured to generate reference data 302, based on the image of the reference element R. The measuring unit 21 (comprising the camera or the pair of stereo cameras) is configured to send the reference data 302 to the control unit 3.

Based on the image data 301, the control unit 3 is programmed to derive information regarding the alignment of the vehicle V: for example, characteristic parameters such as toe, camber and wheel caster.

In an embodiment, the control unit 3 is programmed to derive information regarding the alignment of the vehicle V, based on the image data 301 and on the reference data 302.

The measuring assembly 2 comprises a connector 22. The connector 22 is configured to support the measuring unit 21 during the measuring operations. The connector 22 extends between a first end 22A, positioned at a first height Q1, and a second end 22B, positioned at a second height Q2. The first end 22A is connected to the measuring unit 21.

In a preferred embodiment, the second height Q2 is greater than the first height Q1. In other words, the second end 22B of the connector 22 is located higher up than the first end 22A of the connector 22.

With regard to supporting the connector 22, this disclosure provides two embodiments. More specifically, in a first embodiment, the second end 22B of the connector 22 is connected directly to a fixed structure, outside the apparatus 1—for example, a wall, the floor or the ceiling of the workspace in which the alignment is measured. In an embodiment, the connector is movable relative to the fixed structure—for example, along the longitudinal direction. This aspect allows adapting the longitudinal position of the connector, hence of the measuring unit, to align it with the rear wheels of the vehicle.

In other embodiments, the connector is fixed to the fixed structure since it is already positioned, longitudinally, at a predetermined position at which the (front) wheels of the vehicle are positioned.

In a second embodiment, the apparatus 1 comprises a supporting assembly 23. In this embodiment, the second end 22B of the connector 22 is connected to the supporting assembly 23.

The connector 22 is movable to move the measuring unit 21 towards or away from the two tracks P. More specifically, in an embodiment, the connector 22 is movable between an extended position, where the first end 22A and the second end 22B are spaced apart by a first distance, and a retracted position, where the first end 22A and the second end 22B are spaced apart by a second distance. The second distance is smaller than the first distance to vary the height of the measuring unit 21 by moving it towards or away from the two tracks P, hence from the vehicle being examined.

This allows varying the height of the measuring unit 21 when the vehicle V is raised by a lift CP or after measuring operations have been carried out and the space occupied by the measuring assembly needs to be cleared by moving the measuring assembly to a zone above the zone where it operates when it performs measurements on the vehicle V.

In an embodiment, the connector 22 is an articulated arm, including a plurality of portions which are connected to each other by a corresponding plurality of hinges. In this embodiment, at the retracted position, the portions are folded and the distance between the second end 22B of the connector 22 and the first end 22A of the connector 22 is at its minimum. At the extended position, on the other hand, the portions are extended and the distance between the second end 22B of the connector 22 and the first end 22A of the connector 22 is at its maximum.

In another embodiment, the connector 22 is a telescopic element, including a plurality of portions configured to be contained inside one another when the connector 22 is in the retracted position and to be extended when the connector 22 is in the extended position.

In a further embodiment, the connector 22 may be a (metal) cable wound on a hoist which is configured to rotate to move the connector from the retracted position to the extended position, and vice versa.

The supporting assembly 23 is configured to support the measuring assembly 2 during measurement.

In an embodiment, the supporting assembly 23 is configured to support two measuring units 21, 21' (measuring unit and additional measuring unit) during measurement. In an embodiment, the two measuring units 21, 21' (measuring unit and additional measuring unit) are positioned on the same side of the vehicle. During measurement, in this embodiment, one measuring unit 21 is positioned at the front wheel and the other measuring unit 21' is positioned at the rear wheel.

The supporting assembly 23 may be made according to different embodiments.

In a first embodiment, the supporting assembly comprises a first vertical column 231. The first vertical column 231 extends vertically between a first end 231A and a second end 231B.

The first end 231A is connected to the floor of the workspace, or to the ceiling of the workspace or to a wall of the workspace.

The supporting assembly 23 comprises a beam 232. The beam 232 is preferably perpendicular to the vertical direction (parallel to the weight force). The beam 232 extends along a movement direction between a first end 232A and a second end 232B. The first end 232A of the beam 232 is connected to the second end 231B of the first vertical column 231. This disclosure also intends to protect solutions in which the first vertical column 231 and the beam 232 are made as a single, integrated block.

In this embodiment, the first vertical column 231 and the beam 232 define a cantilevered support SS.

In an embodiment, the supporting assembly 23 comprises a carriage 234.

The carriage 234 is connected to the second end 22B of the connector 22.

The carriage 234 is associated with the beam 232. The carriage 234 is movably connected to the beam 232. The carriage 234 is slidably coupled to the beam 232 on which it moves in a movement direction along a predetermined path between the first end 232A and the second end 232B of the beam 232.

Thus, moving the carriage 234 along the beam results in a corresponding movement of the measuring unit 21 along the same direction but at a lower height. This allows the measuring unit 21 to move from one wheel to the other to capture images of each wheel.

In an embodiment, the first vertical column 231 is rotatable about a vertical axis of rotation. By rotating about the vertical axis of rotation, the movement direction thus varies. The movement direction is therefore variable responsive to the rotation of the first vertical column 231. In this configuration, the measuring unit preferably rotates about the support 22 (so as to be perpendicular to the plane of the wheel).

This feature allows measurement to be performed by a single measuring unit which, to all intents and purposes, has three degrees of freedom:

vertical movement performed by the connector 22;

transverse movement in a movement plane, perpendicular to the first vertical column 231, by rotating the first vertical column 231 and moving the carriage along the beam 232.

Basically, in this embodiment, the position of the measuring unit 21 on the movement plane is identified by polar coordinates such as the angle of rotation of the first vertical column 231 and the distance of the carriage 234 from the first vertical column 231. In addition, a further adjustment is provided by the rotation of the camera itself.

The first vertical column 231 can rotate because the beam is positioned at a height greater than the maximum height of a vehicle that can be examined for the purposes of measuring the alignment of the vehicle.

In an embodiment, the supporting assembly 23 comprises a second vertical column 233. The second vertical column 233 extends vertically between a first end 233A and a second end 233B.

The first end 233A is connected to the floor of the workspace, or to the ceiling of the workspace or to a wall of the workspace. The second end 233B is connected to the second end of the beam 232B. In this embodiment, the supporting assembly 23 thus defines a supporting portal structure PS on whose beam 232 the carriage 234 is slidable.

In an embodiment, the apparatus 1 comprises an additional measuring assembly 2', including a corresponding measuring unit 21' and a respective connector 22'. In an embodiment, the additional measuring assembly 2' includes a corresponding additional supporting assembly 23'.

In this embodiment, the supporting assembly 23 of the measuring assembly 21 is located beside the two tracks P, on a first longitudinal side of the two tracks P. The additional supporting assembly 23' of the additional measuring assembly 21', on the other hand, is located beside the two tracks P, on a second longitudinal side of the two tracks P, opposite the first longitudinal side.

It should be borne in mind that in the embodiment with two measuring assemblies 21, 21', the respective supporting assemblies 23, 23' may be embodied either in the form of the portal supporting structure or in the form of the cantilevered supporting structure SS.

According to a further embodiment, an alternative technique allowing the use of a single measuring unit 21 is described. In this alternative embodiment, the apparatus 1 comprises the supporting assembly 23 and the additional supporting assembly 23' but does not necessarily include two measuring assemblies 21.

In this embodiment, the apparatus 1 comprises a movable beam 235. The movable beam 235 extends along a transverse direction T, perpendicular to the longitudinal direction L, between a first end 235A and a second end 235B. The first end 235A of the movable beam 235 is connected to the beam 232 of the supporting assembly 23. The second end 235B of the movable beam 235 is connected to the beam 232' of the additional supporting assembly 23'.

The carriage 234 is movably connected to the movable beam 235. The carriage 234 is slidably coupled to the movable beam 235 on which it moves in a movement direction along a predetermined path between the first end 235A and the second end 235B of the movable beam 235.

The movable beam 235, at the first end of it, is movably connected to the beam 232 of the supporting assembly 23 and, at the second end of it, to the beam 232' of the additional supporting assembly 23'. Thus, the movable beam 235 is slidably coupled to the beams 232 of the supporting assembly 23 and of the additional supporting assembly 23' on which it moves in a movement direction along a predetermined path between the first end 232A and the second end 2326 of the beams 232.

In this embodiment, therefore, the carriage 234 can move in the movement plane because it moves on the movable beam 235 along the transverse direction T and with the movable beam 235 along the longitudinal direction L.

In this configuration, the measuring unit comprises an additional camera which is rotated by a straight angle relative to the camera of the measuring unit. Thus, when the measuring unit is on one side of the vehicle, a camera is used, and when the measuring unit is on the opposite side of the vehicle, the additional camera is used. Alternatively, in the absence of the additional camera, the camera is rotatable about a vertical axis to rotate by a straight angle and to measure the wheels on each side of the vehicle.

In an embodiment, the measuring assembly 2 and/or the additional measuring assembly 2' each comprise a respective additional measuring unit and a respective additional connector. This embodiment is described below with reference to the measuring assembly 2, it being understood that the features described may also be extended to the additional measuring assembly 2'.

Basically, in this embodiment, the measuring assembly 2 comprises two measuring units 21. Each of the measuring units 21 is connected to the respective connector. To move the measuring units 21 on the beam 232 of the supporting assembly 23, the latter comprises a carriage 234 for each measuring unit 21.

In an embodiment, the apparatus 1 comprises an actuating assembly which is configured to move the measuring unit 21 towards and away from the two tracks P. More specifically, the control unit 3 is configured to send command signals to the actuating assembly to instruct it to move the measuring unit 21. In an embodiment, the actuating assembly comprises a first actuator for moving the carriage 234 on the beam 232. The actuating assembly comprises a second actuator for moving the connector 22 between the extended position and the retracted position. The actuating assembly comprises a third actuator for moving the movable beam 235.

The actuating assembly comprises a fourth actuator for rotating the measuring unit 21. It should be borne in mind that the second, third and fourth actuators may also be combined in a single actuator which, through specific transmissions, may transfer motion to the carriage 234, to the movable beam 235 and to the measuring unit 21.

Moreover, it should be noted that the measuring unit 21 can also be moved manually.

According to an aspect of it, this disclosure provides a method for measuring the alignment of a wheeled vehicle V.

The method comprises a step of positioning a vehicle V on two tracks P, extending along a longitudinal direction L. The method comprises a step of preparing a measuring assembly 2, including a measuring unit 21 and a connector 22, having a first end 22A, connected to the measuring unit 21 and positioned at a first height Q1, and a second end 22B positioned at a second height Q2, greater than the first height Q1.

The method comprises a step of positioning the vehicle on the two tracks P.

The method comprises a step of capturing, for measuring the alignment of the vehicle V.

In the step of capturing, the measuring unit 21 captures images of the vehicle V, preferably images of wheels of the vehicle V. In the step of capturing, a camera captures images of the vehicle V, preferably images of wheels of the vehicle V. The measuring unit generates image data 301 as a function of the images captured. The method comprises a step of sending the image data 301 to a control unit 3.

The method comprises a step of processing the image data and a step of deriving characteristic parameters, representing an alignment of the vehicle, through the control unit 3.

In an embodiment, the method comprises a step of rotating the measuring unit 21 (that is, the camera) about a vertical axis so it is oriented to obtain a correct image of the tyre.

The method comprises a step of correlating. In the step of correlating, the measuring unit captures an image of a reference element R and generates corresponding reference data 302, based on the image of the reference element R. The measuring unit 21 sends the reference data 302 to the control unit 3.

In the step of correlating, the control unit 3 derives the vehicle alignment information based on the image data 301 and on the reference data 302.

In an embodiment, the apparatus 1 comprises a reference element R and an additional reference element R'. The control unit 3 has access to information regarding the mutual position between the reference element R and the additional reference element R'. In an embodiment, the measuring unit captures an image of the additional reference element R' and generates additional reference data 302' based on the image of the additional reference element R'. The control unit 3 correlates the additional reference data 302' with the reference data 302, based on the known mutual position between the reference element R and the additional reference element R'.

The method comprises a step of supporting, in which the connector 22 is supported by a structure. In an embodiment of the method, in the step of supporting, the connector is connected to a fixed structure of the workspace such as, for example, the floor, the ceiling or a wall of the workspace.

In another embodiment, the connector 22 is connected to the fixed structure (floor, ceiling or wall) by a supporting assembly 23.

The method comprises a step of moving the connector 22 between an extended position, where its first end 22A and its second end 22B are spaced by a first distance, and a retracted position, where its first end 22A and its second end 22B are spaced by a second distance, smaller than the first distance, to vary the height of the measuring unit 21 by moving it towards or away from the two tracks P, hence from the vehicle being examined.

In an embodiment, the method comprises a step of supporting, in which the measuring unit is supported by the supporting assembly 23.

In an embodiment, the method comprises a step of moving a carriage 234 along a beam 232 of the supporting assembly 23. In the step of moving the carriage 234, the latter moves in a movement direction along a predetermined path between a first end 232A and a second end 232B of the beam 232.

In an embodiment, the method comprises a step of rotating a first vertical column 231 of the supporting assembly 23 to move the beam 232 in a movement plane, perpendicular to the first vertical column 231. Thus, the step of rotating the first vertical column 231 corresponds to a step of varying the movement direction by varying the orientation of the beam 232.

In an embodiment, the method comprises a step of connecting the supporting assembly 23 to the ceiling or to the floor or to a wall of the workspace.

In an embodiment, in the step of capturing, an additional measuring assembly 2', including a corresponding measuring unit 21' and a respective connector 22', captures respective images of the vehicle V and sends corresponding image data 301 to the control unit 3. That way, the measuring assembly 2 captures images of the wheels located on one side of the vehicle V, while the additional measuring assembly 2' captures images of the wheels located on the opposite side of the vehicle V.

In an embodiment, the method comprises a step of moving a movable beam 235, extending in a transverse direction T, perpendicular to the longitudinal direction L, along the beam 232 of the supporting assembly 23 and along the beam 232' of the additional supporting assembly 23'.

It is specified that a first end 235A of the movable beam 235 is connected to the beam 232 of the supporting assembly 23, while a second end 235B of the movable beam 235 is connected to the beam 232' of the additional supporting assembly 23'.

The carriage 234 moves on the movable beam 235 along the transverse direction T to come into alignment with the tyres PN on both sides of the vehicle.

In an embodiment, the method comprises a step of actuating, in which an actuating assembly moves the measuring unit 21 towards and away from the two tracks P. More specifically, in the step of actuating, the control unit 3 sends command signals to the actuating assembly to instruct it to move the measuring unit 21. In an embodiment, in the step of actuating, a first actuator moves the carriage 234 on the beam 232 or on the movable beam 235. In an embodiment, in the step of actuating, a second actuator moves the connector 22 between the extended position and the retracted position. In an embodiment, in the step of actuating, a third actuator moves the movable beam 235 on the beams 232, 232' of the supporting assembly 23 and of the additional supporting assembly 23'. In an embodiment, in the step of actuating, a fourth actuator rotates the measuring unit.

In an embodiment, the method comprises a step of moving the measuring unit 21 manually.

The invention claimed is:

1. An apparatus for measuring an alignment of a wheeled vehicle, comprising:
   a structure, including a lift, for lifting the vehicle vertically;
   two contact tracks for the wheels of the vehicle, extending along a longitudinal direction from a first end to a second end, the contact tracks being integral to the lift of the structure;
   a measuring assembly, including:
   a measuring unit, including a first camera configured to capture one or more images of the wheels of the vehicle and to generate corresponding image data,
   a connector, having a first end connected to the measuring unit and positioned at a first height, and a second end positioned at a second height, greater than the first height;
   a control unit, configured to receive the image data from the measuring unit and to process the image data to derive vehicle alignment information therefrom, the measuring unit being movable towards and away from the contact tracks,
   a supporting assembly, wherein the second end of the connector is connected to the supporting assembly, and
   a reference structure, positioned at the second end of the contact tracks at a distance therefrom in the longitudinal direction, the reference structure including a reference element and an additional reference element, spaced from one another along a transversal direction, perpendicular to the longitudinal direction and to a vertical direction,
   wherein the measuring unit further includes a second camera, oriented longitudinally, configured to view the reference element or the additional reference element and configured to take images thereof, and
   wherein the structure further includes a vertical column and a beam, connected to the vertical column, the connector being slidably connected to the beam.

2. The apparatus according to claim 1, wherein the supporting assembly comprises a carriage, connected to the second end of the connector and movable along a predetermined path.

3. The apparatus according to claim 2, wherein the supporting assembly includes:
   a first vertical column, extending vertically between a first end and a second end; and
   the beam, wherein the beam extends between a first end, connected to the second end of the first vertical column, and a second end.

4. The apparatus according to claim 3, wherein the carriage is movably connected to the beam.

5. The apparatus according to claim 4, wherein the supporting assembly comprises a second vertical column, extending vertically between a respective first end and a respective second end, connected to the second end of the beam to define a supporting portal structure, wherein the first end of the first vertical column and the first end of the second vertical column are positioned at respective heights which are greater than the first height.

6. The apparatus according to claim 2, wherein the predetermined path is parallel to the tracks.

7. The apparatus according to claim 1, wherein the connector is movable between an extended position, where the first end and the second end are spaced apart by a first distance, and a retracted position, where the first end and the second end are spaced apart by a second distance, smaller than the first distance, to vary the height of the measuring unit.

8. The apparatus according to claim 1, comprising an additional measuring assembly, including a respective measuring unit and a respective connector, wherein the control unit is configured to receive the image data from the measuring unit of the additional measuring assembly.

9. The apparatus according to claim 8, wherein the additional measuring assembly includes an additional measuring unit and a respective additional connector connected to the corresponding additional measuring unit.

10. The apparatus according to claim 1, wherein the second camera is configured to capture an image of the reference element or the additional reference element to generate reference data, and to send the reference data to the control unit.

11. The apparatus according to claim 1, comprising an actuating assembly, configured to move the measuring unit.

12. The apparatus according to claim 11, wherein the control unit is configured to command the actuating assembly to move the measuring unit towards and away from the two tracks.

13. The apparatus according to claim 11, wherein the control unit is configured to command the actuating assembly to move the measuring unit along the longitudinal direction.

14. A method for measuring an alignment of a wheeled vehicle, comprising the following steps:

preparing a structure including a lift, for lifting the vehicle vertically;

preparing two contact tracks, extending along a longitudinal direction from a first end to a second end, the contact tracks being integral to the lift of the structure, and preparing a measuring assembly, including a measuring unit, including a first camera and a second camera, and a connector, having a first end, connected to the measuring unit and positioned at a first height, and a second end, positioned at a second height, greater than the first height;

positioning the wheels of the vehicle in contact with the contact tracks;

through the first camera, capturing one or more images of the wheels of the vehicle and generating corresponding image data through the measuring unit;

processing the image data in a control unit to derive vehicle alignment information therefrom, moving the measuring unit towards and away from the contact tracks and supporting, wherein a supporting assembly is connected to the second end of the connector to support the measuring unit, preparing a reference structure positioned at the second end of the contact tracks at a distance therefrom in the longitudinal direction, the reference structure including a reference element and an additional reference element, spaced from one another along a transversal direction, perpendicular to the longitudinal direction and to a vertical direction; and viewing the reference element or the additional reference element and taking images thereof through the second camera, oriented longitudinally, and wherein the structure further includes a vertical column and a beam, connected to the vertical column, the connector being slidably connected to the beam.

15. The apparatus according to claim 1, comprising an additional measuring unit, having a respective first camera, configured to capture images of the wheel of the vehicle, and a respective second camera, wherein the second camera is configured to view the reference element or the additional reference element and configured to take images thereof.

16. The method according to claim 14, comprising a step of move the measuring unit through an actuating assembly, wherein the control unit commands the actuating assembly to move the measuring unit either towards and away from the two tracks, or along the longitudinal direction.

17. The method according to claim 14, wherein, in the step of moving, the measuring unit is moved along a vertical direction, parallel to the direction of the weight force.

18. The method according to claim 14, wherein, in the step of moving, the measuring unit is moved in parallel with the contact tracks.

19. The method according to claim 14, wherein the measuring unit captures an image of a wheel of the vehicle from a position above the vehicle, to capture an image of the vehicle from above.

20. The method according to claim 14, comprising a step of correlating, wherein the measuring unit captures reference data, representing an image of the reference element or the additional reference element located at a predetermined position, and wherein the measuring unit sends the reference data to the control unit to correlate a measurement performed by the measuring unit.

* * * * *